(12) United States Patent
Kismir et al.

(10) Patent No.: US 8,669,194 B2
(45) Date of Patent: Mar. 11, 2014

(54) AIRBAG

(75) Inventors: Altay Kismir, Windsor (CA); Denis Jimmy Bray, Chatham (CA)

(73) Assignee: Autoliv Development AB, Värgäräda (SE)

(*) Notice: Subject to any disclaimer, the term of this patent is extended or adjusted under 35 U.S.C. 154(b) by 0 days.

(21) Appl. No.: 13/809,484

(22) PCT Filed: Jul. 6, 2011

(86) PCT No.: PCT/EP2011/003347
§ 371 (c)(1),
(2), (4) Date: Jan. 10, 2013

(87) PCT Pub. No.: WO2012/007121
PCT Pub. Date: Jan. 19, 2012

(65) Prior Publication Data
US 2013/0106085 A1    May 2, 2013

(30) Foreign Application Priority Data

Jul. 13, 2010  (DE) .......................... 10 2010 027 085

(51) Int. Cl.
*D03D 15/00* (2006.01)

(52) U.S. Cl.
USPC .......... 442/215; 280/728.1; 442/76; 428/34.1

(58) Field of Classification Search
USPC ................... 383/3; 139/383 R, 384 R, 387 R; 280/728.1, 730.2, 743.1; 428/34.1, 428/36.91; 442/76, 199, 208–217, 226, 442/236, 286
See application file for complete search history.

(56) References Cited

U.S. PATENT DOCUMENTS

| 6,429,155 | B1 * | 8/2002 | Li et al. ........................... 442/76 |
| 6,455,449 | B1 * | 9/2002 | Veiga et al. ................... 442/218 |
| 6,734,125 | B2 | 5/2004 | Veiga |

FOREIGN PATENT DOCUMENTS

| DE | 43 21 311 A1 | 1/1995 |
| DE | 10 2004 022 650 A1 | 12/2005 |
| EP | 0 416 483 A1 | 9/1990 |
| GB | 2 357 520 A | 6/2001 |
| WO | WO 2010/053440 A1 | 5/2010 |

OTHER PUBLICATIONS

PCT International Search Report—Oct. 13, 2011.
German Search Report—Mar. 3, 2011.

* cited by examiner

*Primary Examiner* — Arti Singh-Pandey
(74) *Attorney, Agent, or Firm* — Brinks Gilson & Lione

(57) ABSTRACT

An air bag formed from a one piece woven air bag material having warp threads (10) and weft threads (20) composed of different polymeric fibers. The air bag in accordance with this invention is inexpensive to fabricate without compromises on strength by providing the weft threads (20) and the warp threads (10) have the same thread linear density.

7 Claims, 1 Drawing Sheet

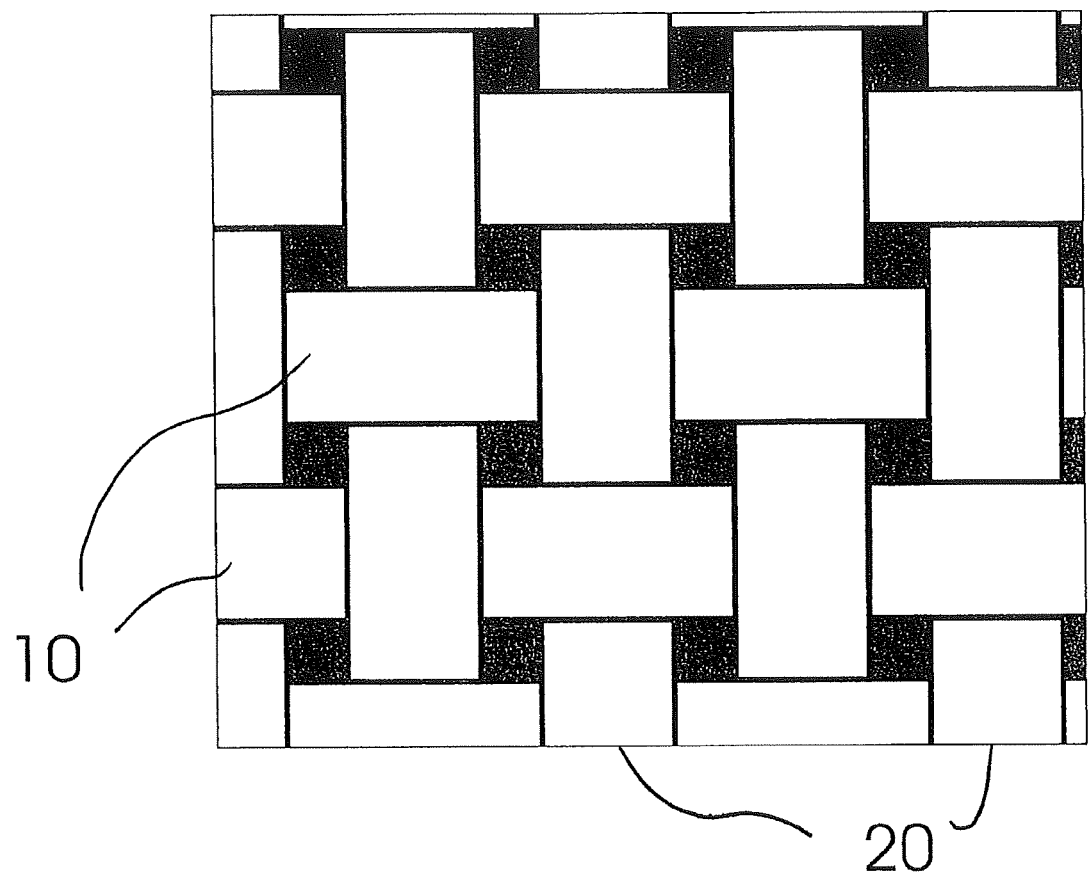

AIRBAG

CROSS-REFERENCE TO RELATED APPLICATIONS

This invention claims priority to Germany Patent Application No. 10 2010 027 085.7, filed Jul. 13, 2010 and PCT/EP2011/003347, filed Jul. 6, 2011.

FIELD OF THE INVENTION

The invention relates to an air bag formed from a one piece woven air bag material having a warp thread and a weft thread composed of different polymeric fibres.

BACKGROUND AND SUMMARY OF THE INVENTION

U.S. Pat. No. 6,734,125 B1 relates to a one piece woven (OPW) air bag, i.e. an air bag formed from a one piece woven air bag material. The air bag itself then requires no cutting and a seam for closing a plurality of superposed air bag plies. The air bag material consists of different polymeric fibres in that nylon, polyester, aramids and carbon fibres are mentioned as examples. U.S. Pat. No. 6,734,125 B1 provides for the warp thread and the weft thread to have different thread linear densities in order that the adhering via coatings or other physical properties of the textile may be improved. One disadvantage of this is the high cost and inconvenience associated with changing over the weaving machine to the respective yarn linear densities.

WO 20101/053440 A1 relates to a woven air bag textile wherein the yarn for the warp thread and the weft thread is formed from filaments composed of a combination of different materials. The filaments consist of polyolefins and polyamides or polyesters, the woven textile can have a silicone-based coating. Only one yarn is used to produce the textile.

It is an object of the present invention to provide an air bag that is inexpensive to fabricate without compromises on strength.

According to the invention, this object is achieved by an air bag having the features described herein.

BRIEF DESCRIPTION OF THE DRAWING FIGURE

FIG. 1 shows a detail of a woven air bag fabric in accordance with this invention.

DETAILED DESCRIPTION OF THE INVENTION

In the air bag of the present invention, which is formed from a one piece woven air bag material having a weft thread and a warp thread composed of different polymeric fibres, the weft thread and the warp thread have the same thread linear density. Using the same thread linear density for the warp and weft threads makes it possible to produce—without costly changing over of the weaving machine—an air bag which, owing to its choice of materials, is fit for the intended purposes, making it possible for inexpensive materials to be used in a flexible manner. For instance, a polyethylene thread is cheaper than a thread formed from aramid fibres, and so a cost advantage is achieved in the case of a mixed use for warp threads and for weft threads. In addition, in the case of a production of an OPW (one piece woven) air bag using threads of the same thread linear density but composed of different materials, no changing over of the equipment is required. Choosing different materials of the same thread linear density allows for rapid and simple conformation to physical requirements in the production of the air bag taking into account the cost criteria.

In a further development of the invention, the weft thread consists of a polyester yarn and the warp thread consists of a polyamide yarn. Using the weft thread composed of the inexpensive polyester yarn makes it possible to achieve the physical properties desired, for example tightness, formability, packageability or thermal resistance, without significantly disfavouring the structural integrity of the air bag, since the strength of the air bag is predominantly provided by the warp thread composed of polyamide, which is stronger and more stable than polyester yarn.

The weft thread is preferably constructed of polyethylene, while the warp thread can consist of nylon, carbon fibre threads or the like.

The threads, i.e. both the warp threads and the weft threads, can have a thread linear density between 235 and 700 dtex in order to achieve conformation to the desired strength and pack size.

A coating, consisting of silicone or silicone based for example, can be provided on the air bag material. Alternatively or additionally, the coating can consist of an organic material or be constructed of a foil composed of a composite material of construction.

An embodiment of the invention will now be more particularly described by way of example with reference to the single FIGURE.

The FIG. 1 shows a detail of a woven air bag fabric having warp threads 10 and weft threads 20 passing alternatingly over and under each other. In addition to an alternating arrangement of warp threads 10 and weft threads 20, two or more weft threads 20 may pass directly next to each other over and under the weft threads 10 in order that a different surface texture may be obtained. In addition to the 1/1 (warp/weft) pattern shown, 1/2, 2/2, 2/1 or else 3/1 or other weave patterns are also possible.

The warp threads 10 consist for example of a polyamide yarn, for example nylon-6,6 having a thread linear density of 470 dtex, while the weft threads 20 consist of a polyethylene and likewise have a thread linear density of 470 dtex. The warp threads 10 and the weft threads 20 may consist of a multiplicity of yarn filaments.

Polyester fibres cost less than polyamide fibres, but a polyester yarn requires a different dressing material and a different finish to a polyamide yarn, entailing increased complexity, material requirements and time to dress and set up the warp beam, i.e. the beaming operation. Manufacturing costs and quality assurance costs may rise because the weaving machine needs more cleaning. The washing operation in the production of the air bag material may give rise to increased costs, since removal of polyester-compatible size or adhesive requires different washing solutions than those suitable for polyamide fibres. This leads to increased complexity, material requirements and machine set-up time, inter alia on account of the washing process. Quality issues due to changing the washing solution may likewise arise.

The use of warp beams suitable for polyester yarn reduces the flexibility of the weaving process and of manufacturing oversight. Changing from polyamides to polyester threads on the warp beam needs a longer set-up time, since the warp beams have to be removed.

Using polyamides in the warp direction, for example as nylon-6,6 yarn, while polyester is used in the weft direction, avoids these issues. Using the same thread linear densities for warp threads and weft threads does away with the need to change over the particular machine. The woven air bag fabric can further be produced using conventional standard constructions. The use of polyester yarn in the weft direction only does not reduce the design effort for the production of the air bag material. The air bag material can be scoured in a conventional manner using the same scouring solution as for polyamide yarn.

The ready-produced air bag material can be coated with a silicone, with a silicone-based organic material, with an organic material or with a composite material of construction in the shape of a film in order that the air bag material may be conformed to the desired requirements for the particular air bag application.

Using polyester yarn as weft thread does not affect sizing or finishing as well as beaming or section warping, nor the subsequent scouring process. The weaving process and production control are further flexible with regard to design changes, since the warp beam remains unchanged and polyamides continue to be used as warp threads. The construction of the woven fabric need not be changed and, more particularly, the thread linear densities in the weft direction need not be changed to meet the requirements of woven air bag fabrics, since the main load in the woven air bag fabric in the case of one piece woven air bags, more particularly in the case of "inflatable curtains", extends in the warp direction. The strength of the air bag is therefore not compromised by the use of polyester fibres in the weft direction. In addition, the use of the inexpensive polyester—compared with polyamide fibres—provides a directly visible cost benefit without increasing hidden costs, for example increased change-over costs or cleaning costs or quality costs.

While the above description constitutes the preferred embodiment of the present invention, it will be appreciated that the invention is susceptible modification, variation and change without departing from the proper scope and fair meaning of the accompanying claims.

The invention claimed is:

1. An air bag formed from a woven airbag material which consists of polyamide warp threads and polyester weft threads, the warp threads and the weft threads having the same thread linear density, and the airbag material forms a one piece woven airbag.

2. An air bag according to claim 1, further comprising that the weft threads (20) consists of polyethylene.

3. An air bag according to claim 1, wherein the warp and the weft threads (10, 20) have a thread linear density between 235 dtex and 700 dtex.

4. An air bag according to claim 1, further comprising that the warp threads (10) consist of nylon.

5. An air bag according to claim 1, further comprising that a coating is provided on the warp and the weft threads of the air bag material.

6. An air bag according to claim 5, further comprising that the coating consists of at least one of silicone, a coating based on silicone, and an organic material.

7. An air bag according to claim 6, further comprising that the coating is a film of a composite material.

* * * * *